(12) United States Patent
Maloney

(10) Patent No.: US 8,366,364 B2
(45) Date of Patent: Feb. 5, 2013

(54) PIERCING STANDOFF

(75) Inventor: Michael J. Maloney, Doylestown, PA (US)

(73) Assignee: PEM Management, Inc., Wilmington, DE (US)

( * ) Notice: Subject to any disclaimer, the term of this patent is extended or adjusted under 35 U.S.C. 154(b) by 611 days.

(21) Appl. No.: 12/616,233

(22) Filed: Nov. 11, 2009

(65) Prior Publication Data

US 2010/0129174 A1 May 27, 2010

Related U.S. Application Data

(60) Provisional application No. 61/116,863, filed on Nov. 21, 2008.

(51) Int. Cl.
*F16B 37/04* (2006.01)
(52) U.S. Cl. ........ 411/179; 411/107; 411/112; 411/176; 411/183
(58) Field of Classification Search .................. 411/103, 411/107, 172, 174, 179, 180, 112, 176, 183, 411/399
See application file for complete search history.

(56) References Cited

U.S. PATENT DOCUMENTS

| | | | |
|---|---|---|---|
| 3,000,420 A * | 9/1961 | Spokes | 411/180 |
| 3,079,970 A * | 3/1963 | Barry | 411/113 |
| 3,133,579 A | 5/1964 | Grimm et al. | |
| 3,276,499 A | 10/1966 | Reusser | |
| 3,461,936 A | 8/1969 | Rosan Jose | |
| 3,556,189 A | 1/1971 | Ernest | |
| 3,871,264 A | 3/1975 | Hallock | |
| 4,003,286 A | 1/1977 | Hallock | |
| 4,004,483 A | 1/1977 | Hallock | |
| 4,193,333 A | 3/1980 | Hallock | |
| 4,430,034 A | 2/1984 | Fujikawa | |
| 4,449,878 A | 5/1984 | Hallock | |
| 4,911,592 A * | 3/1990 | Muller | 411/181 |
| 4,915,558 A * | 4/1990 | Muller | 411/179 |
| 5,020,950 A * | 6/1991 | Ladouceur | 411/107 |
| 5,207,588 A | 5/1993 | Ladouceur et al. | |
| 5,237,733 A | 8/1993 | Ladouceur et al. | |
| 5,489,176 A * | 2/1996 | Fultz | 411/181 |
| 5,613,815 A * | 3/1997 | Muller | 411/181 |
| 5,868,535 A | 2/1999 | Ladouceur | |
| 6,122,816 A | 9/2000 | Ladouceur | |
| 7,032,296 B2 | 4/2006 | Zdravkovic et al. | |
| 7,066,700 B2 | 6/2006 | Ward et al. | |
| 7,287,944 B2 * | 10/2007 | Ladouceur | 411/107 |
| 7,425,111 B2 | 9/2008 | Ladouceur | |
| 2002/0067975 A1 * | 6/2002 | Wojciechowski et al. | 411/183 |
| 2003/0059272 A1 * | 3/2003 | Petrok et al. | 411/107 |
| 2005/0008453 A1 * | 1/2005 | Babej et al. | 411/500 |
| 2005/0025605 A1 | 2/2005 | Vrana et al. | |
| 2006/0099047 A1 | 5/2006 | Bentrim | |
| 2006/0115344 A1 * | 6/2006 | Ladouceur | 411/181 |

* cited by examiner

*Primary Examiner* — Roberta Delisle
(74) *Attorney, Agent, or Firm* — Gregory J. Gore

(57) ABSTRACT

A piercing fastener is attachable to a panel without a hole by penetrating its surface. The fastener further includes means for attachment of a device to it so that the fastener acts as an intermediate component attaching the device to the panel. The fastener has either male or female attachment means and further includes an outside surface extending from a top end to a bottom end. Near the bottom end, a reinforcement collar includes an annular top surface for receiving a downward pressing force to install the fastener into the panel. A displacer and undercut are located immediately below the collar to effect and receive a cold flow of deformed panel material to secure the fastener to the panel. A plurality of axially extending circumferential teeth are located immediately below the undercut and comprise triangular knurls with sharp edges which penetrate the sheet as the fastener is applied. The bottom of the fastener terminates in a sharp circular cutting edge for penetrating the panel.

9 Claims, 6 Drawing Sheets

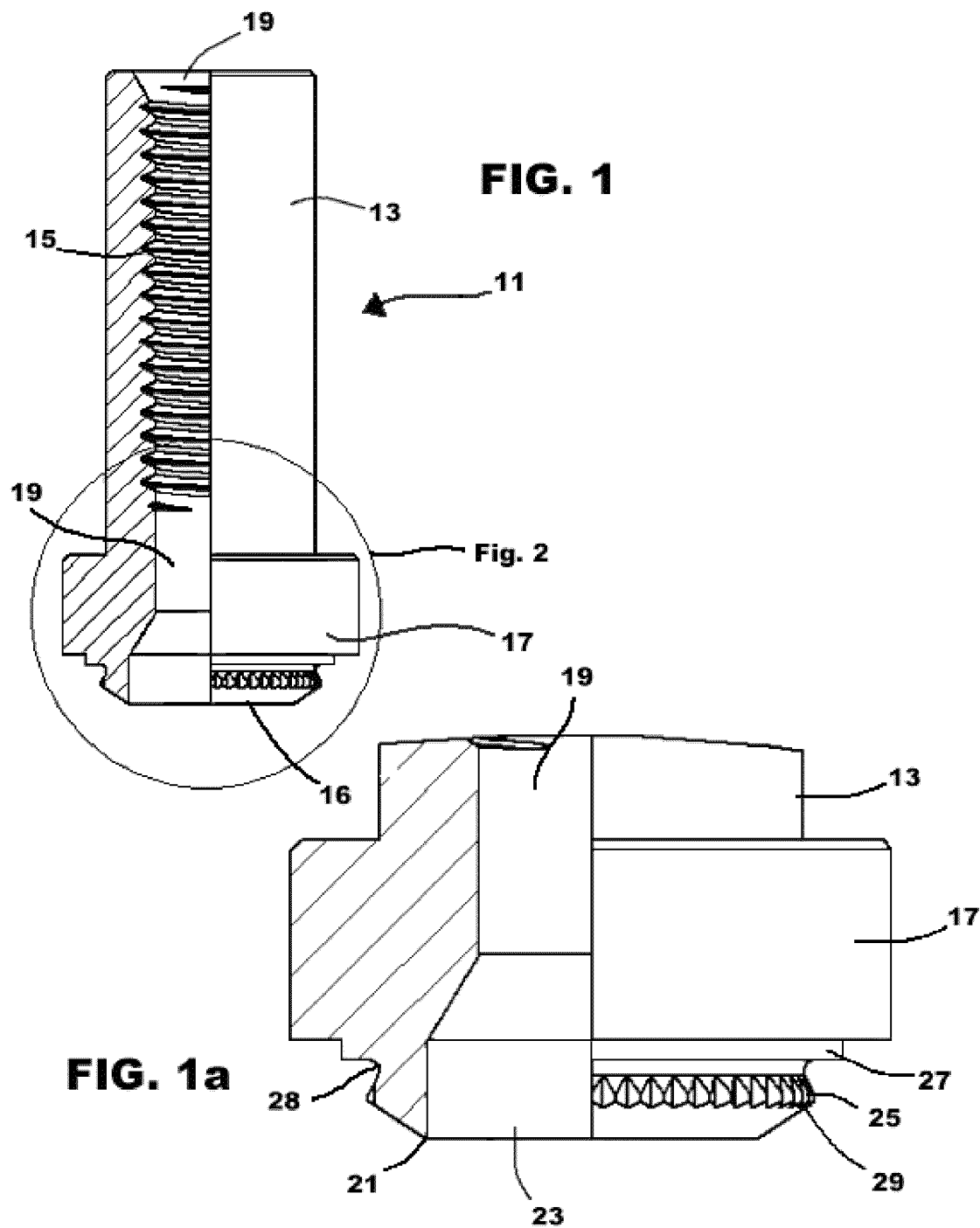

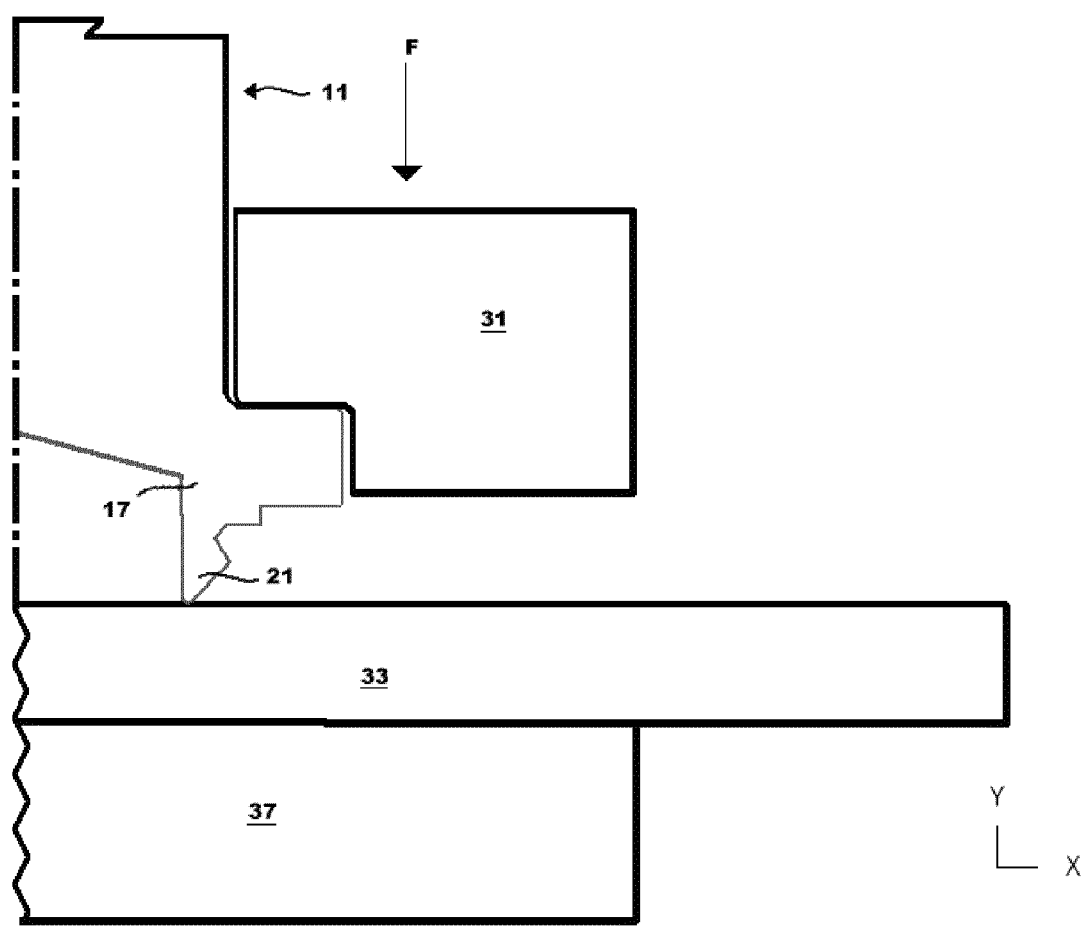

PIERCING STANDOFF

RELATED APPLICATION

This patent application is related to provisional patent application Ser. No. 61/116,863 entitled "Piercing Standoff" filed on Nov. 21, 2008, priority from which is hereby claimed.

FIELD OF THE INVENTION

This invention relates to fasteners which may be attached to a sheet by forcibly embedding them into the material of the sheet as the penetrating end of the fastener deforms thereby resisting withdrawal of the fastener from the sheet.

BACKGROUND OF THE INVENTION

A significant shortcoming of concealed head self-clinching studs and standoffs is that a hole must first be counterbored using a flat end mill wherever a fastener is intended to be installed. Past efforts to design self-piercing or self-attaching fasteners which do not require a hole in the substrate material include nails and rivets which can be driven into soft substrate material relative to the hardness of the fastener. In many cases, a special anvil is required to support the back side of the sheet which cooperates with the configuration of the driven, piercing end of the fastener so that the penetrating end deforms to clinch into the sheet. The penetrating end of the fastener may be heat treated to a hardness which is greater than the hardness of the structural metallic member into which the fastener is driven. Despite the past efforts in this field, there still exists a need for an economical and effective self-attaching fastener which does not require a mounting hole or a specially configured supporting anvil to achieve secure attachment of the fastener to the supporting substrate.

SUMMARY OF THE INVENTION

The present invention can be embodied as either a standoff or a stud and has a clinching profile, but includes a cutting leading edge ahead of the clinching feature, and the center of the fastener is hollow to reduce the projected area being pressed into the metal, and to allow for metal flow into the center of the part. Knurling of the shank, rather than on the displacer, creates torque resistance, with the added benefit of reducing the projected area that needs to be pressed into the surface for installations without a hole. A much greater hardness differential between panel and clinching fastener is necessary due to the greater amount of material displacement and work hardening. Additionally, the effective depth of the displacer ring is very thin since not much material displacement is required, however reinforcement of this ring is necessary to keep it from shearing off during installation, either by hardening or the addition of supporting material adding to its thickness which does not get embedded into the sheet.

The piercing function of the present fastener eliminates the need for counterboring or drilling a hole. As the fastener is pressed into a flat sheet of metal, the leading edge of the shank cuts into the surface. The material of the sheet is permitted to flow upward within the fastener into its center. An undercut on the outside of the shank is filled when the displacer presses metal downward into the undercut. Torque resistance is achieved by knurls on the shank. As the part is being pressed into the sheet it is locked firmly in place as displaced metal fills the undercut, closing in above the knurls. Because the attachment features are located along the outside surface of the fastener where the surface area and diameter is the greatest, a very strong joint between the fastener and the panel is achieved.

More specifically, the inventor has created a piercing fastener being attachable to a panel and having means for attachment of a device thereto comprising a barrel having an axial throughbore and an outside surface extending from a top end to an open bottom end thereof, said throughbore including an inner wall of increased diameter at a bottom portion thereof terminating at a sharp circular edge for penetrating said panel. A reinforcement collar extends radially from the barrel's outside surface near a bottom end thereof, said collar being the largest diameter of said fastener and having an annular top surface adapted to receive a downward pressing force. An annular displacer is located immediately below the collar and includes an annular bottom surface for forcibly deforming the panel. An undercut groove is located on the outside surface immediately below the displacer for receiving a cold flow of deformed panel material. A plurality of axially extending circumferential teeth are located immediately below the undercut on said external surface. The teeth extend to a greater diameter than the undercut but are of lesser diameter than the displacer. A chamfer extends downward and inwardly from said teeth terminating at a circular cutting lip at the bottom end of the fastener.

The present piercing fastener is preferably used with a panel which is a metal sheet. The top portion of the throughbore may be threaded to provide attachment for a device which would therefore attach the device to the panel. The teeth can be triangular knurls with sharp edges which penetrate the sheet as the fastener is applied. The triangular shape of the knurls is provided by a flared lower surface of the undercut above and the chamfer directly below it. To facilitate piercing the sheet, the barrel inner wall is cylindrical along its bottom portion which extends to the piercing edge of the cutting lip. Filling of the undercut with the deformed panel material is facilitated by an outwardly flared lower surface of the undercut.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a partial sectional front elevation view of the fastener of the invention.

FIG. 1a is an enlargement portion of FIG. 1 as shown in that figure.

FIG. 2 is a partial sectional front elevation view of the installation setup for applying the fastener.

DESCRIPTION OF THE PREFERRED EMBODIMENT

Figure 3A:
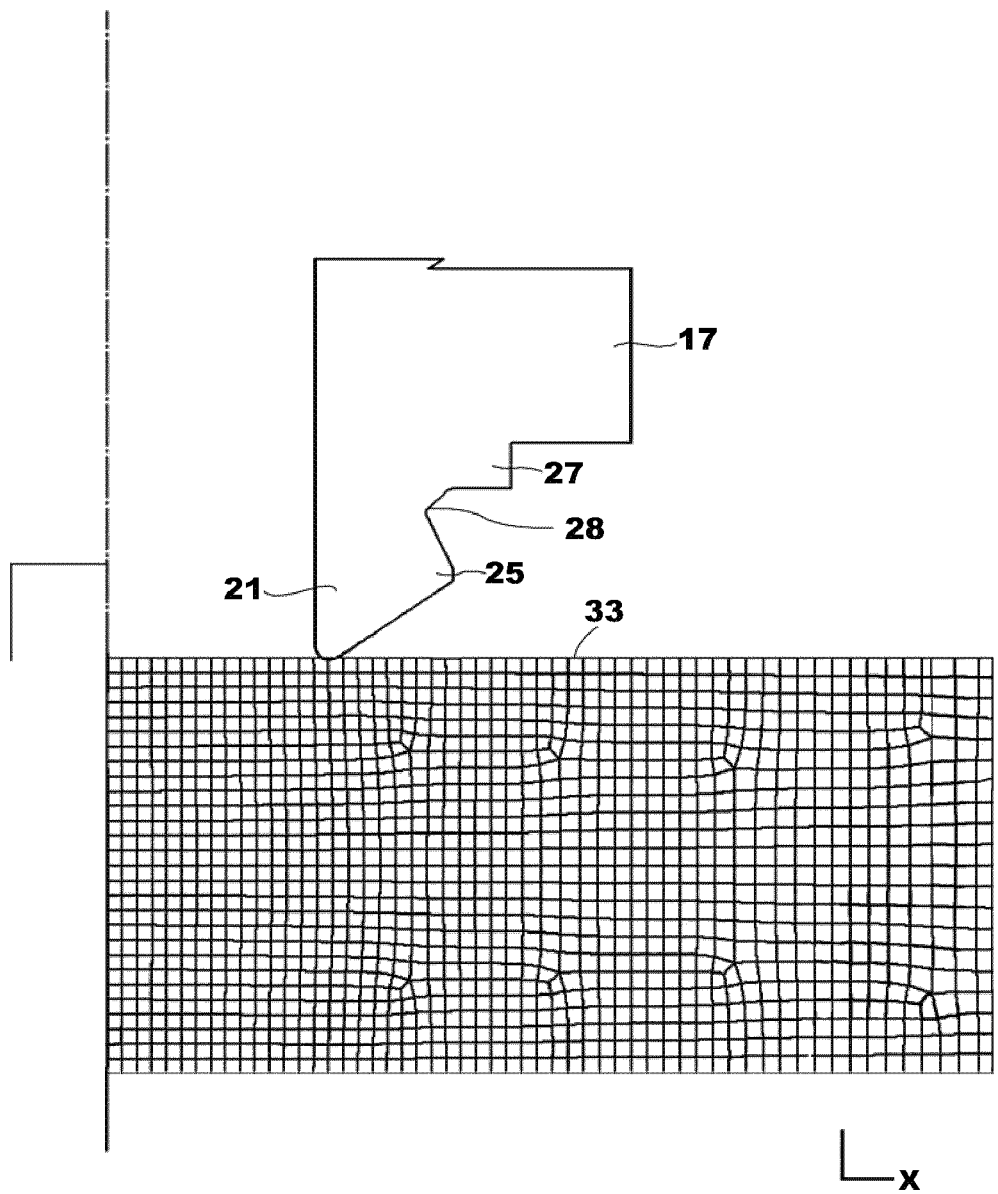
FIGS. 3a, 3b, 3c and 3d are partial sectional views of the installation sequence.

Referring now to FIG. 1, a standoff fastener of the invention 11 is shown in a partial sectional view. The fastener includes a barrel portion 13 which has an internal bore 19 open at the top end and bottom end. The bore in this embodiment includes internal threads 15 to receive a like-threaded fastener for attachment of an article. The base of the standoff includes a reinforcement collar 17 which provides the structural strength to receive the driving force necessary to install the standoff and to control the deformation of the penetrating end of the fastener 16 at the bottom.

FIG. 1a is an enlargement taken from FIG. 1. It shows greater detail of the penetrating end of the standoff of the invention. The internal bore 19 opens into an enlarged area 23 at the bottom or attachment end of the standoff. At the bottommost edge of the fastener, an inward tapering of the base material along surface 29 creates a circular cutting lip 21. The features of the fastener which provide the mutual deformation of the fastener and the substrate material so that the tight clinch attachment is achieved include displacer collar 27 and an undercut 28 of reduced diameter which lies between the displacer 27 and outwardly flared teeth 25 that bite into the substrate material to resist rotation of the fastener once it has been installed. In an alternate embodiment (not shown), the bore does not extend upward beyond the reinforcement collar and the outside surface of the barrel is threaded, providing a mounting stud to receive an internally threaded part such as a nut.

FIG. 2 depicts the installation setup for applying the fastener of the invention. The fastener 11 is forcibly applied to a sheet 33 by pressing fixture 31 that applies downward force F to a reinforcement collar 17 at the base of the insert. If force F continues to be applied, the cutting lip 21 begins to penetrate into the surface of sheet 33 which is supported on the backside by anvil 37.

Figure 3B:
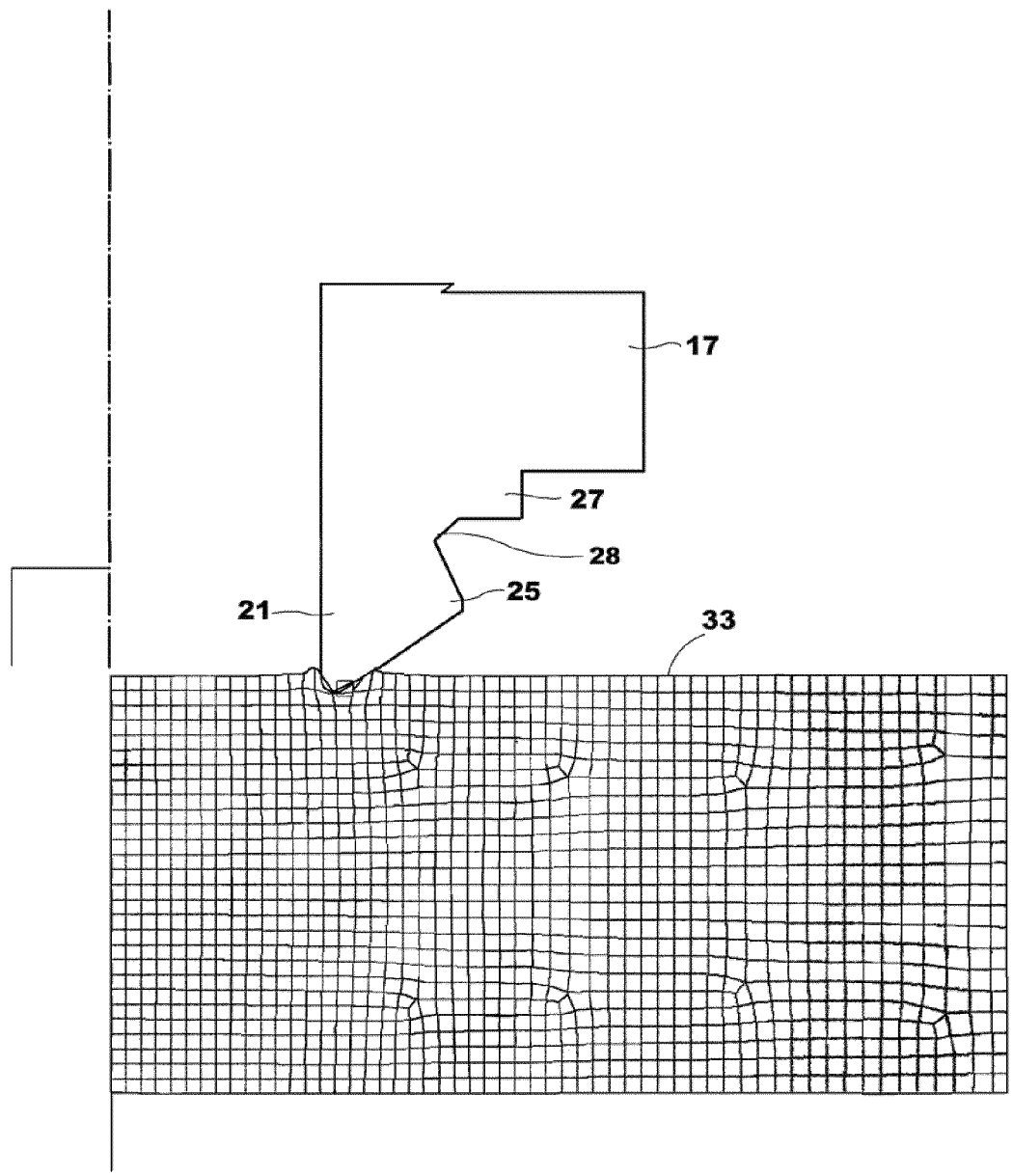
Figure 3C:
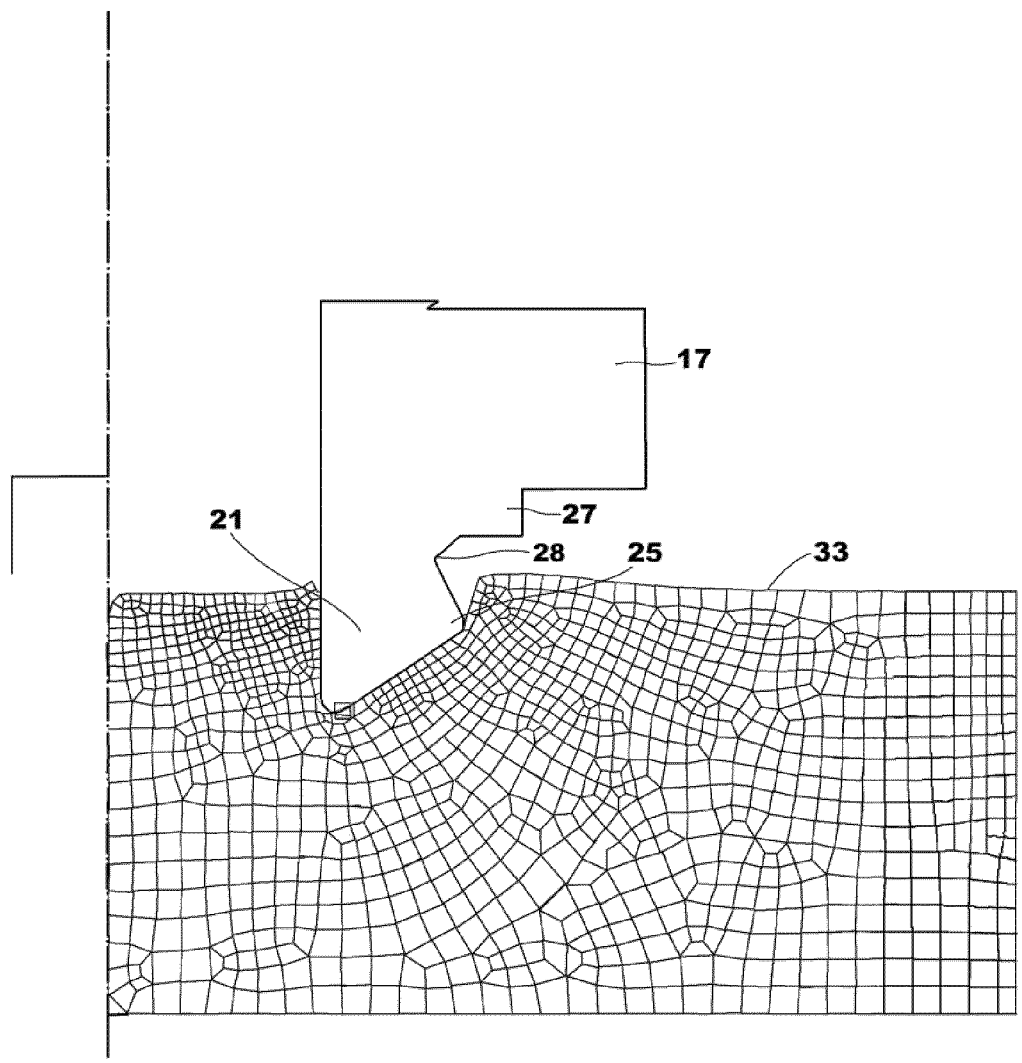
Figure 3D:
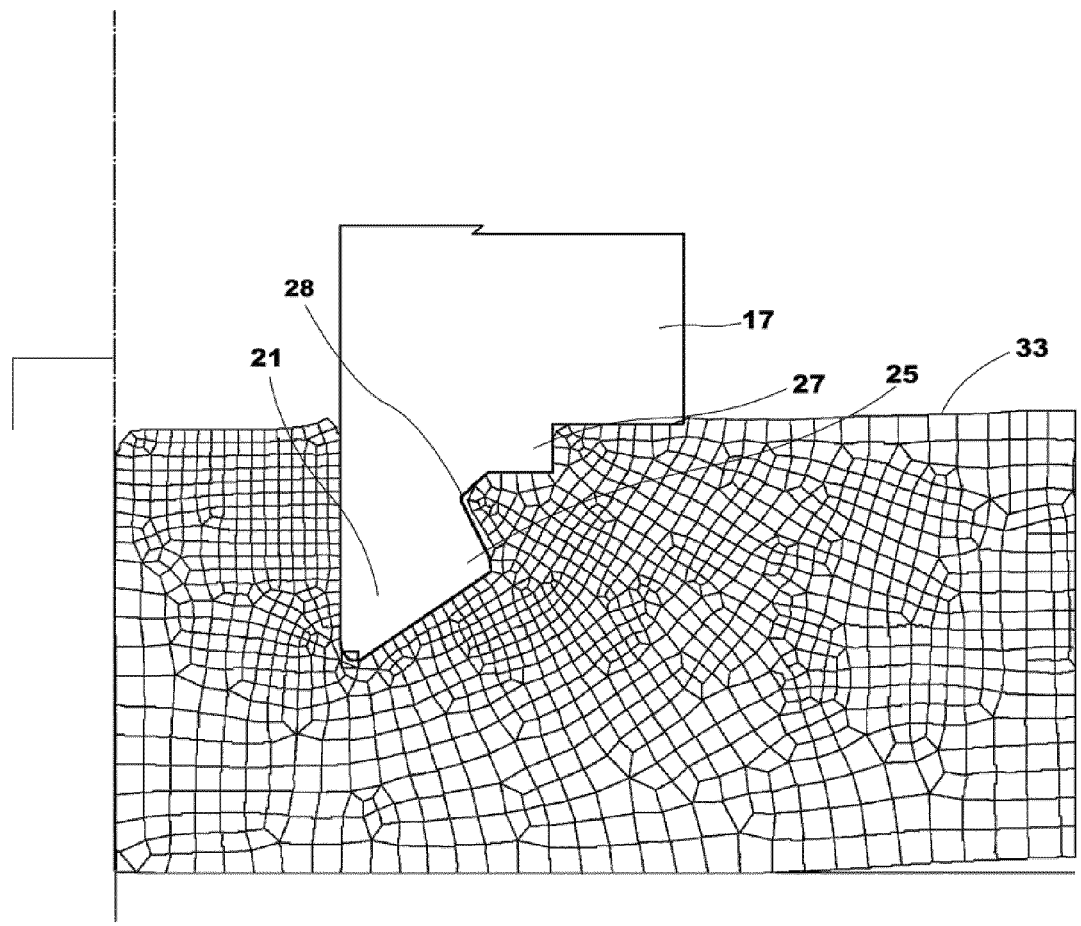

The installation sequence is shown in FIGS. 3a-3d. As illustrated in these figures, the cutting lip 21 at the leading edge of the shank cuts into the surface of the sheet 33. The softer material of the sheet is permitted to flow upward in the center of the fastener and also around the outside surface of the shank which includes radially projecting triangular shaped knurls 25. The outside of the shank also includes an undercut 28 which is filled when the displacer 27 presses the metal downward into the undercut as it closes in over the knurls thus locking the part in place.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A piercing fastener being attachable to a panel by penetration of its continuous planar surface and having means for attachment of a device thereto, comprising:
    a barrel having an axial throughbore and an outside surface extending from a top end to an open bottom end thereof, said throughbore including an inner wall of increased diameter at a bottom portion thereof terminating at a sharp circular edge for penetrating said panel;
    a reinforcement collar located at the base of the barrel extending radially from said barrel's outside surface, said collar being the largest diameter of said fastener and having an annular top surface adapted to receive a downward pressing force;
    an annular displacer located immediately below said collar and including an annular bottom surface for forcibly deforming material of said panel downward;
    an undercut groove of lesser inside diameter than said displacer located on said outside surface immediately below said displacer adapted to receive a cold flow of panel material deformed by said displacer;
    a plurality of axially extending circumferential teeth located immediately below said undercut on said outside surface, said teeth extending to a greater diameter than said undercut but being of lesser diameter than said displacer; and
    a chamfer extending downward and inwardly from said teeth terminating at a circular cutting lip at the bottom end of the fastener, said fastener having features for penetrating into but not through said panel.

2. The fastener of claim 1 wherein a top portion of said throughbore is threaded.

3. The fastener of claim 1 wherein said teeth are triangular knurls.

4. The fastener of claim 1 wherein said panel is a metal sheet.

5. The fastener of claim 1 wherein said inner wall is cylindrical and coaxial with said barrel at said bottom portion thereof and extends to the edge of said cutting lip.

6. The fastener of claim 1 wherein said undercut has an outwardly flared lower surface.

7. A piercing fastener attached to a panel and having means for attachment of a device thereto, comprising:
    a panel having a continuous planar surface without a fastener-receiving hole in an area where said fastener is received into the material of the panel;
    a piercing fastener having a barrel and further including an outside surface extending from a top end to an open bottom end thereof,
    a bore including an inner wall at a bottom portion thereof terminating at a sharp circular edge for penetrating said panel;
    a reinforcement collar located at the base of the barrel extends radially from said external surface, said collar being the largest diameter of said fastener and having an annular top surface adapted to receive a downward pressing force;
    an annular displacer located immediately below said collar and including an annular bottom surface for forcibly deforming material of said panel downward;
    an undercut groove of lesser inside diameter than said displacer located on said outside surface immediately below said displacer adapted to receive a cold flow of panel material deformed by said displacer;
    a plurality of axially extending circumferential teeth located immediately below said undercut on said outside surface, said teeth extending to a greater diameter than said undercut being of lesser diameter than said displacer; and
    a chamfer extending downward and inwardly from said teeth terminating at a circular cutting lip at the bottom end of the fastener, wherein said fastener does not penetrate through the opposite of said panel.

8. The fastener of claim 7 wherein said outside surface is threaded.

9. The fastener of claim 7 wherein said teeth are triangular knurls.

\* \* \* \* \*